United States Patent
Strein et al.

(10) Patent No.: US 11,455,228 B2
(45) Date of Patent: Sep. 27, 2022

(54) NON-LINEAR MANAGEMENT OF REAL TIME SEQUENTIAL DATA IN CLOUD INSTANCES VIA TIME CONSTRAINTS

(71) Applicant: Disney Enterprises, Inc., Burbank, CA (US)

(72) Inventors: Michael J. Strein, Bohemia, NY (US); Craig L. Beardsley, Chicago, IL (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/983,063

(22) Filed: Aug. 3, 2020

(65) Prior Publication Data
US 2022/0035724 A1 Feb. 3, 2022

(51) Int. Cl.
G06F 11/34 (2006.01)
G06F 9/50 (2006.01)
H04L 41/22 (2022.01)
H04L 41/12 (2022.01)

(52) U.S. Cl.
CPC ........ G06F 11/3409 (2013.01); G06F 9/5072 (2013.01); G06F 11/3452 (2013.01); H04L 41/12 (2013.01); H04L 41/22 (2013.01)

(58) Field of Classification Search
CPC .... G06F 11/3409; G06F 9/5072; H04L 41/12; H04L 41/22
See application file for complete search history.

(56) References Cited

U.S. PATENT DOCUMENTS 10,284,889 B1 * 5/2019 Jimenez ............... H04N 21/262
2008/0279219 A1 11/2008 Wu et al.
2019/0007754 A1 * 1/2019 Master ............... H04N 21/8352
2019/0122659 A1 * 4/2019 Miller ................. G06F 3/0482
2020/0107062 A1 4/2020 Pichaimurthy et al.
2020/0236083 A1 7/2020 Johns
2020/0310857 A1 * 10/2020 Sharma ................ G06F 9/5077
2020/0403972 A1 12/2020 Strein et al.
2020/0404033 A1 * 12/2020 Strein .................. H04L 41/069
2020/0404034 A1 12/2020 Strein et al.
2020/0404035 A1 12/2020 Strein et al.

OTHER PUBLICATIONS

Wang et al., "Workflow as a Service in the Cloud: Architecture and Scheduling Algorithms," Procedia Comput Sci. 2014; 29: 546-546-556.
Mike Strein and Karl Paulsen, "Audio," SMPTE Motion Imaging Journal, Jun. 2020, 13 pages.

* cited by examiner

Primary Examiner — Kristie D Shingles
(74) Attorney, Agent, or Firm — Patterson + Sheridan, LLP (57) ABSTRACT

Non-linear management of real time sequential data in cloud instances via time constraints is provided by: receiving, at a cloud network facility from a media production facility, a selection of component media flows for assembly into an assembled media package; identifying a time constraint for assembling component media flows into the assembled media package; identifying processes to perform with respect to the component media flows during assembly of the assembled media package; in response to an estimated time to perform the processes with respect to the component media flows exceeding the time constraint, adjusting performance of the processes with respect to the component media flows to increase a speed of performance; and performing, in the cloud network facility, the processes with respect to the component media flows as adjusted to produce the assembled media package.

19 Claims, 8 Drawing Sheets

NON-LINEAR MANAGEMENT OF REAL TIME SEQUENTIAL DATA IN CLOUD INSTANCES VIA TIME CONSTRAINTS

BACKGROUND

Cloud computing offers users various hardware resources (e.g., processing power and storage) and software data processing packages as services. These services are often offered at remote facilities from where the user is located, such as in a datacenter, and can be used to process workflows in parallel across several real or virtual machines in the remote environment. Processing a workflow in parallel with another work flow to create a final package can improve the speed at which the final package is assembled compared to linearly processing each workflow that is part of the final package. As developers and users migrate real time workflows to cloud-based operations, various delays are introduced, which can negatively affect streaming workflows (e.g., as can be used with media production). These delays include path delays in reaching the cloud with the data, processing delays imparted by sequential software processes in in the cloud environment, and transmission delays in send the data to an intended destination.

SUMMARY

In one aspect, the present disclosure provides for non-linear management of real time sequential data in cloud instances via time constraints via a method that includes: receiving, at a cloud network facility from a media production facility, a selection of a plurality of component media flows for assembly into an assembled media package; identifying a time constraint for assembling the plurality of component media flows into the assembled media package; identifying a plurality of processes to perform with respect to the plurality of component media flows during assembly of the assembled media package; in response to an estimated time to perform the plurality of processes with respect to the plurality of component media flows exceeding the time constraint, adjusting performance of the plurality of processes with respect to the plurality of component media flows to increase a speed of performance; and performing, at the cloud network facility, the plurality of processes with respect to the plurality of component media flows as adjusted to produce the assembled media package.

In one aspect, the present disclosure provides for non-linear management of real time sequential data in cloud instances via time constraints via a method that includes: identifying a first media flow at a media production facility; identifying a second media flow at a different location than the media production facility; identifying a time constraint for producing a media package at a cloud network facility, wherein the media package is assembled to include the first media flow and the second media flow; in response to assembly of the media package exceeding the time constraint, identifying a bottleneck procedure in producing the media package; adjusting the bottleneck procedure to assemble the media package in a time less than or equal to the time constraint; assembling the media package based on the first media flow, the second media flow and the adjusted bottleneck procedure; and transmitting the media package.

In one aspect, the present disclosure provides for non-linear management of real time sequential data in cloud instances via time constraints via a system that includes: a media production facility in communication with a cloud network facility via a common carrier; an orchestration layer running in the media production facility and the cloud network facility over the common carrier; and a resource manager in communication with the media production facility and the cloud network facility configured to access, via the orchestration layer, a plurality of component media flows located at the media production facility, on the common carrier, and at the cloud network facility to produce an assembled media package within a target time from the plurality of component media flows within the target time.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

The present disclosure provides for the non-linear management of real time sequential processes in cloud instances via time constraints. Latencies and delays from the client, to the cloud, to the destination are accounted for and controlled to establish a predictable processing latency pipeline with various contingencies to account for delays that exceed the controlled delays. A state machine manages the disparate processes in a given workflow in the cloud environment, and manages a set of time constraints on the summed latencies of these processes to ensure that a real time process completes on schedule for transmission to a destination. The state machine manages the data through one or more processes (in series, parallel, or combinations thereof) to produce an output within a given time period to provide a real time output assembled from one or more sources in a cloud environment.

As used herein, "real time" refers to the generation and transmission of content from a producer's facility (whether local or cloud-based) to a consumer within a short time period. Various media production facilities may set different definitions or requirements for an amount of delay between content generation and transmission that can be acceptable and classified as "real time" or "near real time". For example, when transmitting video of a newscast, the assembled video stream can combine several video and voice overs (e.g., displaying several windows of remotely located correspondents, commentators, anchors, etc.). In the assembled vide stream each video segment should be combined to form the assembled video stream within the time set for a video frame in the combined stream, otherwise viewers may notice artifacts or other aberrant behavior in the stream. For example, in the production of a video workflow for a 30 frames per second (30 FPS) media stream, each video frame is generated in 33 ms (milliseconds) or less to ensure a smooth framerate for the consumer. As will be appreciated, a consumer can record real time content for later playback or can cache/buffer the real time content to account for jitter or uneven transmission from the producer. Whether content is "real time" or not, therefore, describes an aspect of the content before transmission to a consumer, where the producer is generating or manipulating the content just-in-time for transmission.

As used herein, "unicast" describes communications where a piece of information is sent from one point to another point. In a unicast transmission there is only one sender and one receiver. Unicast transmission in an Internet Protocol (IP) based network, in which a packet is sent from a single source to a specified destination, is a predominant form of transmission on Local Area Networks (LANs) and within the Internet. All LANs (e.g., Ethernet) and IP networks support the unicast transfer mode, such as the standard unicast applications (e.g., HTTP, SMTP, FTP and TELNET), which employ TCP (Transmission Control Protocol).

As used herein, "multicast" describes communications where a piece of information is sent from a first set of one or more points to a second set of points to a receiver set, which any number of receivers can elect to join. In IP based networks, there may be one or more senders, and the information is distributed to a set of zero or more receivers (i.e., there may be no receivers, or any other number of receivers.) Multicasting is the networking technique of delivering the same packet to a group of clients. The format of an IP multicast packet is identical to that of unicast packets and is distinguished by the use of a special class of destination address (e.g., class D IPv4 addresses), which denotes a specific multicast group. In some cases, a multicast communication can be sent from a single sender to a receiver set including a single receiver, but is differentiable from a unicast message based on the message being addressed to the receiver set (e.g., via a multicast group identifier) instead of being addressed to the individual receiver (e.g., via an IP address). Since TCP supports only the unicast mode, multicast applications must use another protocol, such as the User Datagram Protocol (UDP) transport protocol. Unlike broadcast transmission (which is used on some local area networks), multicast clients receive a stream of packets only if those clients have previously elected to do so by joining the specific multicast group address. Membership of a group is dynamic and controlled by the receivers (which is in turn informed by the local client applications).

Although examples are primarily given herein in relation to video data, it will be appreciated that the present disclosure can be applied with various data types for the non-linear management of real time sequential processes in cloud instances via time constraints.

Figure 1:
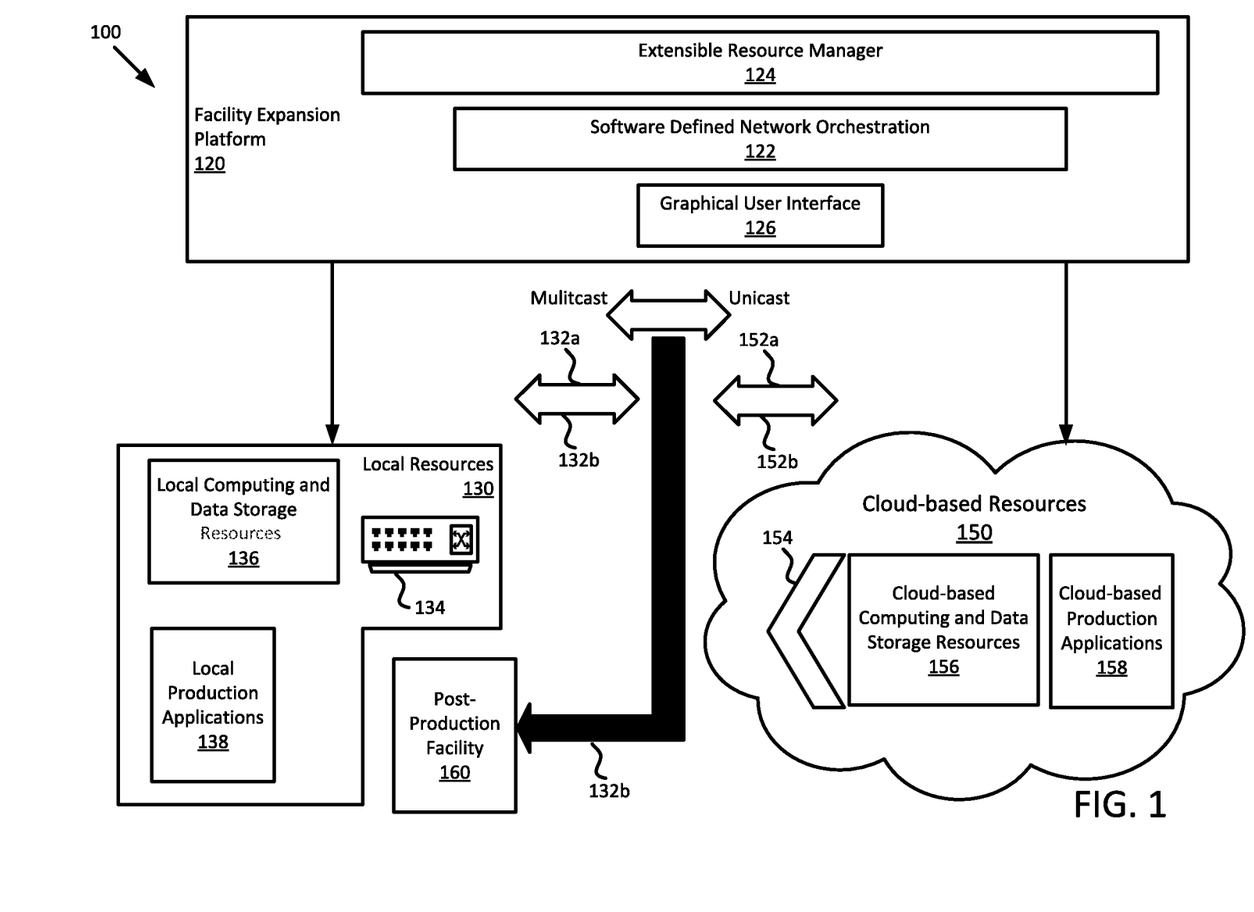
FIG. 1 illustrates an exemplary cloud-extensible media production system, according to aspects of the present disclosure.

FIG. 1 illustrates an exemplary cloud-extensible media production system 100, according to aspects of the present disclosure. As shown in FIG. 1, cloud-extensible media production system 100 includes a local production facility (represented by the local resources 130) interactively linked with a cloud-based environment (represented by the cloud-based resources 150). As shown in FIG. 1, a local production facility includes local resources 130 generating multicast production media flows 132a and that are communicatively coupled to facility expansion platform 120. The local resources 130 include a local physical production network 134, local computing and data storage resources 136, and local production applications 138. In addition, FIG. 1 shows a Software Defined Network Orchestration (SDNO) 122 and an Extensible Resource Manager (ERM) 124 hosted by facility expansion platform 120, and graphical user interface (GUI) 126 providing a production monitoring and/or control dashboard for an optional user of facility expansion platform 120.

The cloud-based virtual production environment includes cloud-based resources 150 that receive and process unicast production media flows 152a corresponding to multicast production media flows 132a, thereby producing post-production unicast media flows 152b. As shown in FIG. 1, cloud-based resources 150 include cloud bandwidth 154, cloud-based computing and data storage resources 156, and cloud-based production applications 158. Also shown in FIG. 1 is physical, i.e., not cloud-based or virtual, post-production facility 160 receiving multicast media flows 132b. It is noted that physical post-production facility 160 may be another production facility similar to local production facility, or may be a media distribution hub, such as a regional affiliate or other affiliated media distributor. It is further noted that multicast media flows 132b may correspond to unicast production media flows 152a after unicast production media flows 152a are processed to produce post-production unicast media flows 152b, and post-production unicast media flows 152b are converted to multicast media flows 132b. Unicast production media flows 152a are processed and post-production unicast media flows 152b are converted using cloud-based virtual production environment.

The cloud-extensible media production system 100 provides an exemplary framework by which the local production facility can up-scale or down-scale per production needs by expanding into cloud-based virtual production environment accordingly. The SDNO 122 extends the local production facility into the cloud-based virtual production environment to manage multicast and unicast production media flows 132a, 152a, create a virtual network managing the bandwidth and allocation of unicast production media flows 152a, as well as announcing and discovering of cloud-based resources 150. In other words, the SDNO 122 identifies and reserves the cloud-based resources 150 for required production processes and manages the connections. In one aspect, this would be accomplished by the cloud vendors providing standard application programming interfaces (APIs) to cloud-based resources 150. The ERM 124 is hosted by facility expansion platform 120 to manage/reserve cloud-based resources 150 required by the media workflows, spinning up computing and storage processes as needed, and loading the required applications. The ERM 124 can additionally manage the licenses for the applications, should additional applications be required. ERM management of cloud-based resources 150 and licensing may be API based such that the ERM 124 can present a media based dashboard to a user via GUI 126, while allocating the appropriate resources from the cloud provider.

In public cloud environments, the cloud host provider may work with the media applications, the SDNO 122 and the ERM 124 to present a user in a local production facility with a hybrid (but apparently seamless) production environment. Standards and specifications such as Networked Media Open Specifications (NMOS) that define the methods for discovery, bandwidth reservation, and the like can be used to establish the framework to create this hybrid architecture, and enable the ERM 124 and the SDNO 122 to establish the features required for a dynamic environment. As a result, the SDNO 122 and ERM 124 present the user with a seamless environment where asset management for resources are located (e.g., at the local production facility or in the cloud-based virtual production environment).

Figure 2:
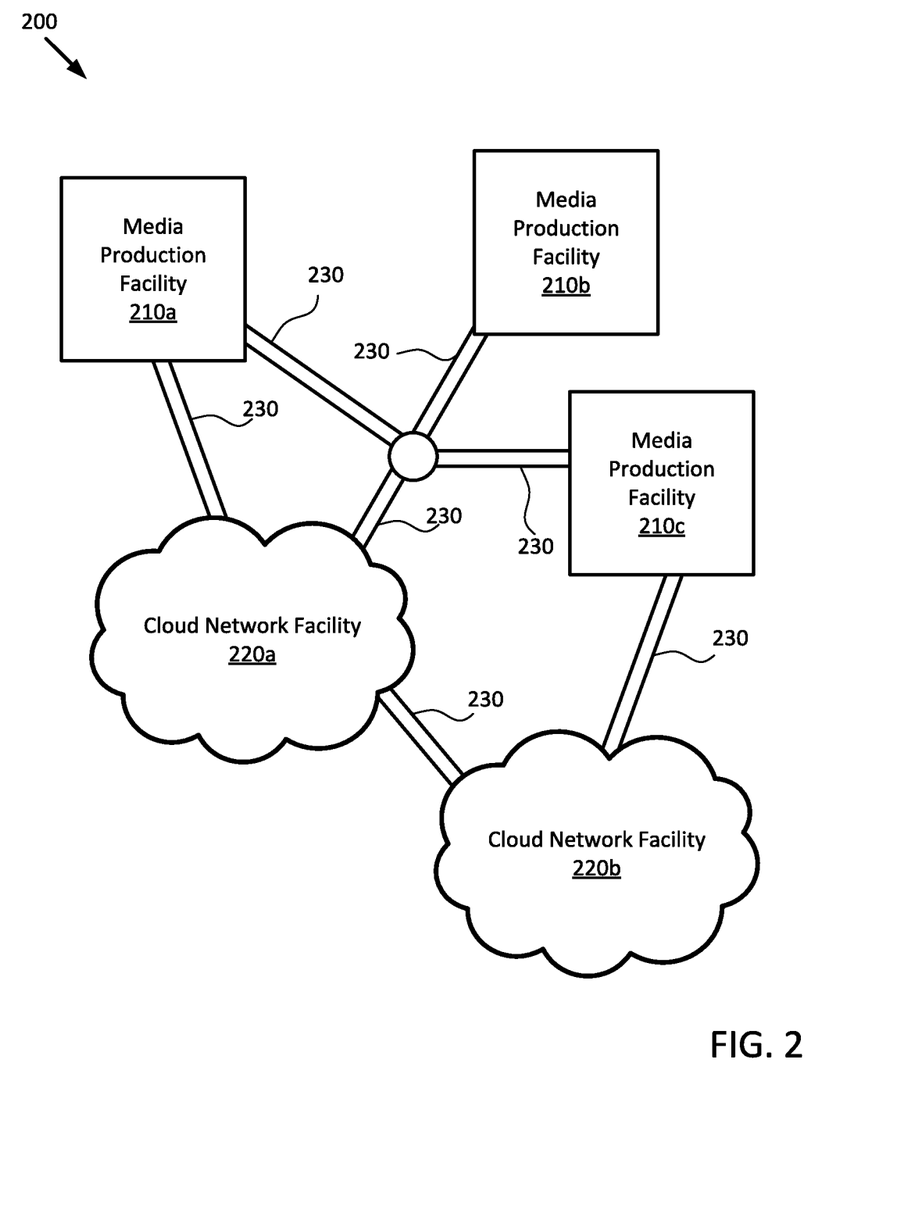
FIG. 2 illustrates a transmission environment, according to aspects of the present disclosure.

FIG. 2 illustrates a transmission environment 200, according to aspects of the present disclosure. Depending on the physical locations of the various facilities producing, storing, transmitting, and otherwise accessing media flows, different pathways can link the separate locations that are geographically distinct from one another (e.g., located in different buildings, on different campuses, in different cities, etc.). For example, one or more media production facilities 210*a-c* (generally, media production facility 210) at different physical sites from one another can be linked with one another and one or more cloud network facilities 220*a-b* (generally, cloud network facility 220) via a common carrier 230 (e.g., a telecommunications exchange). The common carrier 230 provides transmission pathways, switches, hubs, etc., to transmit data between different locations, and may include hardware managed by several different operators (e.g., internet service providers, backhaul providers, and backbone network providers). Although FIG. 2 illustrates an example that includes three media production facilities 210*a-c* and two cloud network facilities 220*a-b*, it will be appreciated that more or fewer media production facilities 210 and more or fewer cloud network facilities 220 may be included in other examples.

Within a given media production facility 210, an operator has control over how media flows are managed and transmitted, but when a media flow leaves the media production facility 210, the operator of the other facilities/resources (e.g., a second media production facility 210, a cloud network facility 220, and/or a common carrier 230) gain at least partial control over how the media flow is handled. For example, when the operator of a media production facility 210 transmits a media flow outside of the media production facility via a common carrier 230, the operator of the common carrier 230 can aggregate, route, and schedule transmission of data over wired or wireless communications channels (e.g., copper cables, fiber optic cables, satellite or terrestrial signaling channels) under the control of the common carrier 230. Similarly, when an operator of a cloud network facility 220 receives a media flow, the cloud network facility 220 controls what physical device the media flow is stored on (and retrieved from), how the media flow is stored/retrieved, and how the media flow is aggregated with other files and data. Additionally, as a cloud network facility 220 can provide cloud computing services to several different clients (e.g., as a public cloud network), the operator of the cloud network facility 220 may encrypt data so that two parties with data on the same computing device (or running virtual machines on the same computing device) cannot access one another's data or services.

The traffic carrying the media flows move between the facilities in real time as streams. These streams may be directed to various destinations, and may be requested by several users at different locations for manipulation or inclusion in other media flows. A given media flow may be requested by several different users located at different production facilities 210 while also being sent to the cloud network facility 220 (or several such cloud network facilities 220) simultaneously. For example, a news feed may originate from the first media production facility 210*a* and be modified at a second media production facility 210*b* and at a third production facility 210*c* while in transit to a cloud network facility 220. Although in a multicast environment several devices may subscribe to a feed to receive the media flow in the "home" environment, in a unicast environment (such as the common carrier 230 and cloud network facilities 220), the individual unicast flows need to be managed to ensure that the requesting devices receive the appropriate media flows, regardless of the physical locations of those requesting devices or the media flows.

Figure 3:
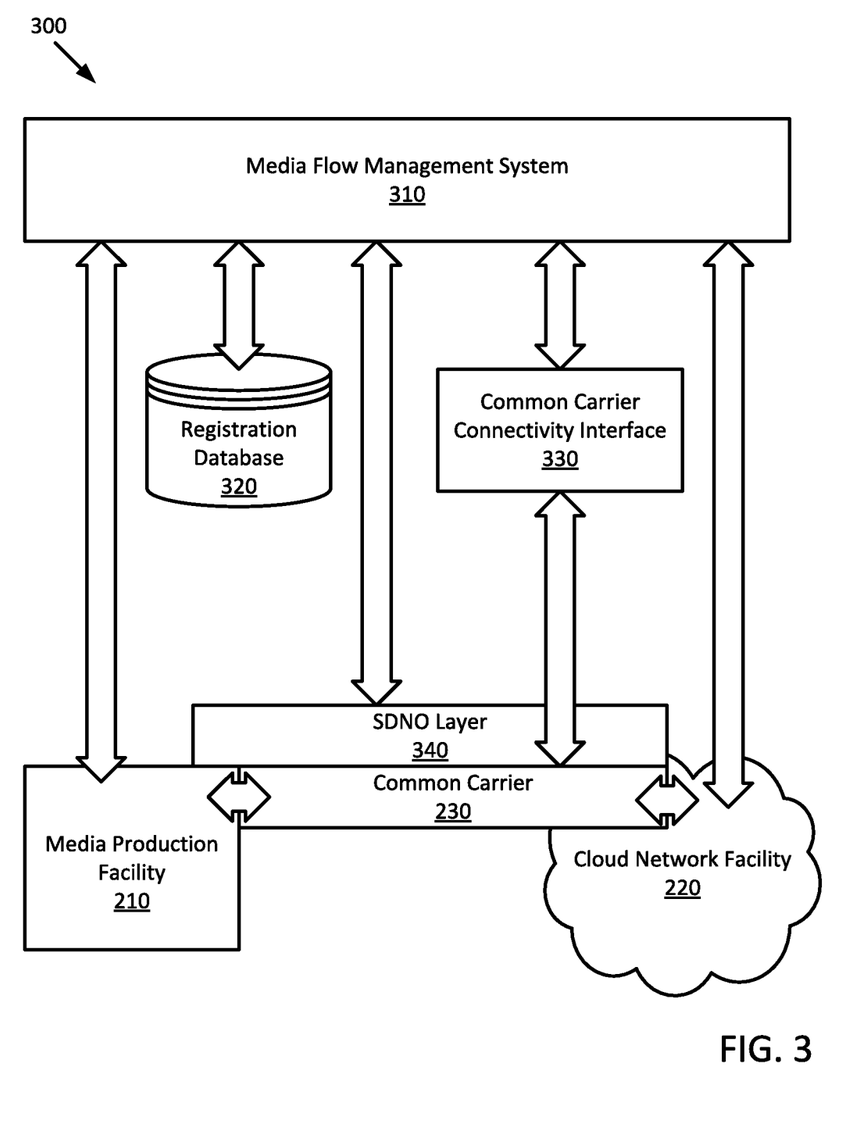
FIG. 3 illustrates an orchestration management schema, according to aspects of the present disclosure.

FIG. 3 illustrates an orchestration management schema 300, according to aspects of the present disclosure, to provide the management of unicast media flows to ensure that the requesting devices receive the appropriate media flows, regardless of the physical locations of those requesting devices or the media flows. The orchestration management schema 300 provides a true hybrid production environment that uses SDNO to manage media flows for broadcast when using a public cloud network in conjunction with local media production management practices, by making the media flows navigable throughout the distribution network. A media flow management system (MFMS) 310 ensures that media flows located at various on-site and off-site locations can be accessed and retrieved reliably and quickly for the production of media in real, or near-real, time by production devices located at various media production facilities 210 or operating cloud-based software packages in a cloud network facility 220.

The MFMS 310 is in communication with a registration database 320 that stores information for where a given media flow is located as well as various features of the media flow. For example, a media flow can include various video segments, audio segments, graphics (still or animated), content triggers (e.g., identifying when another media flow can begin), content metadata describing contents of the media flows (e.g., running times; file formats; descriptors of the locations, persons, or subjects included in the media; etc.); and/or usage metadata describing how the media flows have been used or broadcast (e.g., tallies indicating current or live broadcast, counts of previous broadcasts, locations/station identifiers that used the media flow, etc.). The registration database 320 can include an identifier for the media flow, various metadata regarding the media flow, and/or a storage location of the media flow (e.g., at a given media production facility 210, at a given cloud network facility 220, on a given common carrier 230). The information held in the registration database 320 enables users of the MFMS 310 to locate and access the media flows at various facilities to thereby edit, consume, reorder, combine, split, or otherwise manipulate the data of the media flows as though the media flows were stored and controlled locally to the user.

To ensure that the information held in the registration database 320 is accurate and up-to-date as media flows pass between various facilities, the MFMS 310 is in communication (via various Application Program Interfaces (APIs)) with the media production facility(s) 210, the cloud network facility(s) 220, the common carrier(s) 230 via a common carrier connectivity interface 330, and an SDNO layer 340. The common carrier connectivity interface 330 can be provided as an API providing intercommunication between the MFMS 310 and the common carrier 230. The MFMS 310 updates the registration database 320 based on the status of the media flow changes. For example, when multiple media flows are combined, (e.g., a graphic is overlaid onto a video segment), the MFMS 310 registers the combination and/or the creation of a new combined media flow. Media flows are combined in common carriers 230 for increasing transmission efficiency (similarly to multiplexing in satellite transmission), and two (or more) media flows can be combined for transmission regardless of whether the individual media flows are related to one another. For example, a first media flow of a news feed and a second media flow of a sports broadcast (which might not ever be broadcast together) can be combined together to share a signaling path over the common carrier 230. There are bandwidth allocation advantages of combining media flows that have no relationship to one another in statistical multiplexors, so that bandwidth can be "borrowed" from each signal during the different times when one of the individual media flow is less complex and requires less bandwidth than the others.

In a further example, when a media flow that is stored is requested for broadcast (e.g., a media flow is pre-produced and stored before distribution to end consumers), the MFMS 310 indicates via a tally that the given media flow is being used, and that the given media flow is to be protected from deletion and should be carefully edited (if at all) until the tally is removed (e.g., when broadcast concludes).

As media flows originating from various media production facilities 210 are generated and placed onto the common carrier 230 for transmission to a cloud network facility 220 or as media flows stored outside of the media production facilities 210 are requested for retrieval or manipulation from the cloud network facility 220, the MFMS 310, via the SDNO layer 340, ensures that the media flows undergo the proper conversions for use of the media flow in the destination facility. For example, when leaving the media production facility 210, the SDNO layer 340 may apply a low-latency compression to the media flow, migrate the media flows from multicast to unicast, place the media flows with the common carrier 230 from the real time network in the media production facility 210 for transmission to the cloud network facility 220, or perform combinations thereof. In reverse, when returning to the media production facility 210 from the cloud network facility 220, the SDNO layer 340 migrates the media flows from unicast to multicast, removes the low-latency compression from (i.e., decompresses) the media flow, or perform combinations thereof. In some aspects, the SDNO layer 340 also ensures that media flows are cohesively aggregated together (e.g., with similar or related media flows) into a bundled media flow when exiting the media production facility 210 and are properly extracted and/or disseminated from a bundled media flow received back to the media production facility 210. The SDNO layer 340 ensures that regardless of where the media flow is located, that the media flow is addressable and locatable by a user for use in broadcast or in producing additional media flows.

The MFMS 310 identifies each individual media flow uniquely via a key value or unique identifier in the registration database 320 (along with the associated statuses and contents), and tracks the media flows traversing the various networks and facilities in the registration database 320. In various embodiments, the unique identifier associated with the media flow is intelligently assigned based on the nature of the media flow, where the media flow was generated, etc., to aid in human interpretation of the media flows (e.g., TV2CAM3, WASHFEED1, LONDFEED6). The MFMS 310 provides these tracking data to operators, indicating the availability of various media flows for use in producing a broadcast.

Figure 4A:
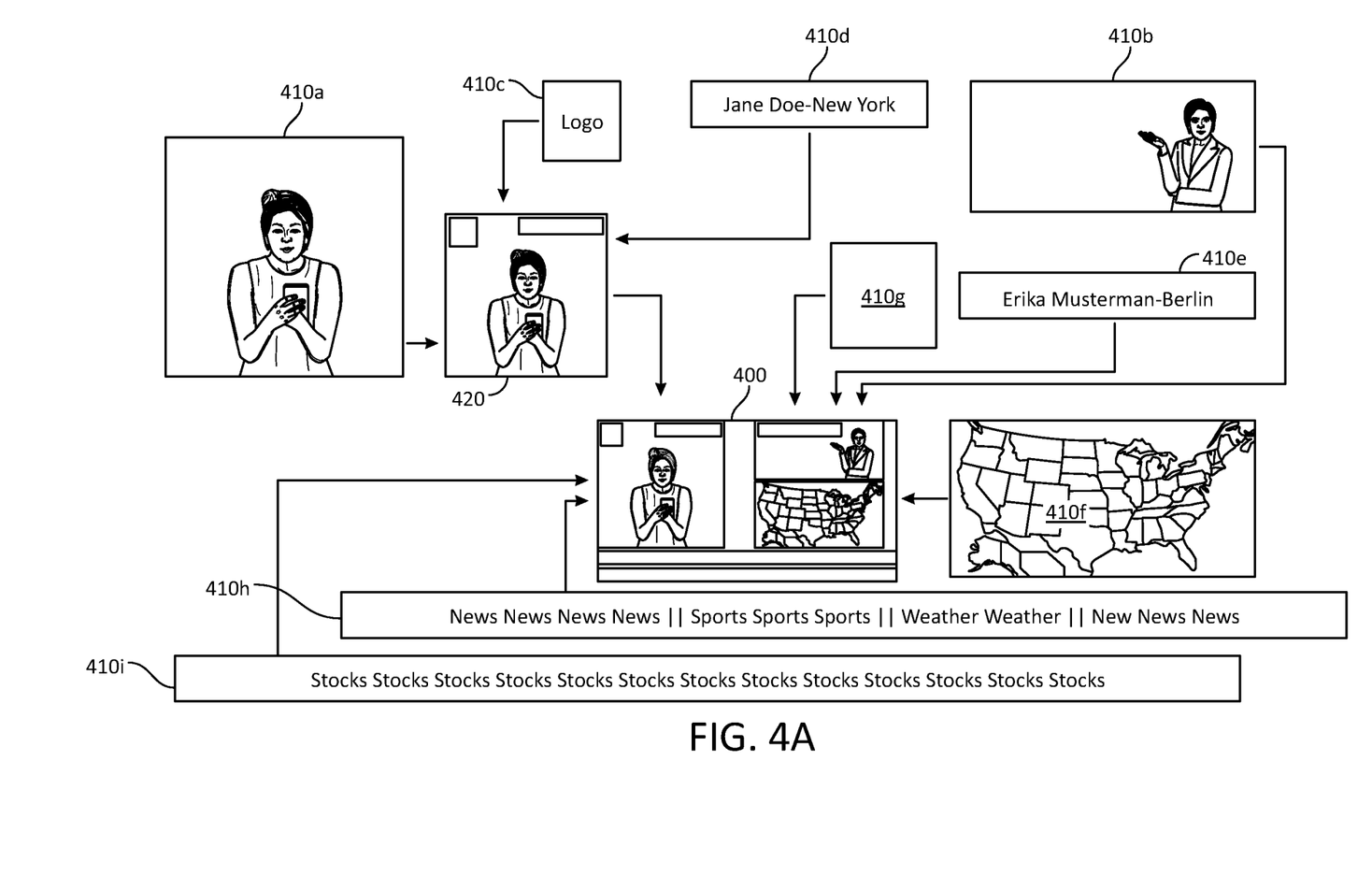
FIG. 4A illustrates an example set of component media flows, according to aspects of the present disclosure.
Figure 4B:
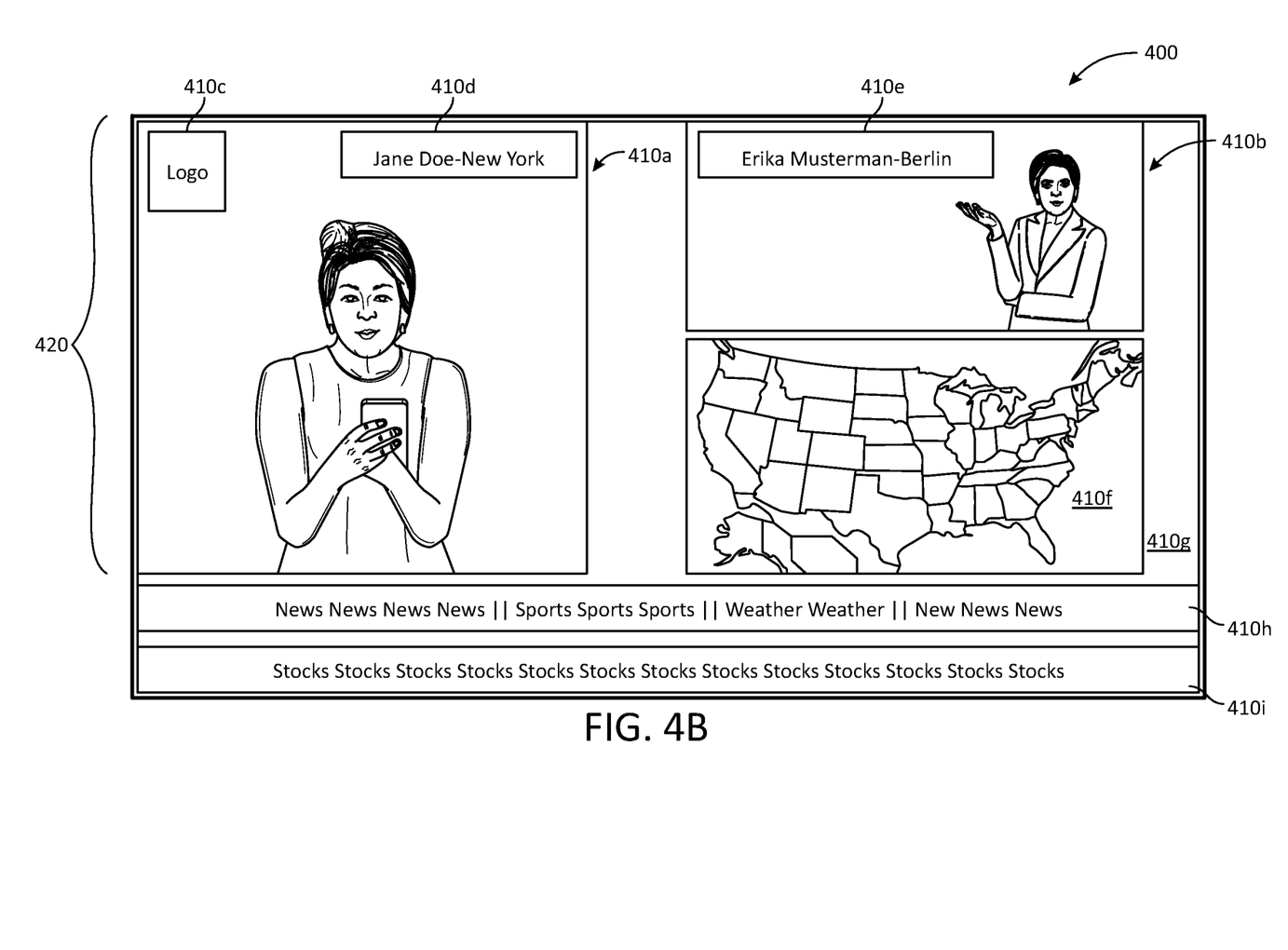
FIG. 4B illustrates an example assembled media package, according to aspects of the present disclosure.

FIGS. 4A and 4B illustrate an example assembled media package 400, according to aspects of the present disclosure. An assembled media package 400 includes several components media flows 410a-i (generally or collectively, component media flow(s) 410) that are arranged relative to one another to produce one streamable media flow. Each of the individual component media flows 410 can be produced in real time at different facilities (as shown in FIG. 4A) and can be adjusted, combined, or manipulated at various facilities to produce a final (or intermediate) media package 400 (as shown in FIG. 4B). The assembled media package 400 can, for example, provide a newscast, a sporting event broadcast, a live scripted series, a teleconference, a video game with commentary, or other real time media event that combines several individual real time streamable media flows and (optionally) one or more effects or static/pre-recorded media flows. Once assembled, the assembled media package 400 can be multicast to viewers or local affiliates, such as with a television production or real time stream, or can be distributed to co-participants, as in teleconferences.

In the illustrated example shown in FIGS. 4A and 4B of a newscast, the assembled media package 400 includes nine individual component media flows 410a-i. As will be appreciated, more or fewer component media flows 410 of different types and in different arrangements are possible for an assembled media package 400. In FIGS. 4A and 4B, the first component media flow 410a is shown as a first live video feed of a first presenter that is recorded at a first media production facility 210a (e.g., in a television studio), and the second component media flow 410b is shown as a second live video feed of a second presenter that is a recorded at a second media production facility 210b (e.g., an in-field or mobile production facility). In the intermediate media flow 420, the first component media flow 410a is shown overlaid with a station logo defined in a third component media flow 410c and an infographic (such as the first presenter's name or location) in a fourth component media flow 410d. Similarly, in the assembled media package 400, the second component media flow 410b is shown overlaid with a fifth component media flow 410e of a second infographic (e.g., the name and location of the second presenter).

Additionally, a sixth component media flow 410f of an animated or pre-rendered graphic, and a seventh component media flow 410g of a background are included in the assembled media package 400. The eight component media flow 410h and the ninth component media flow 410i shown in the assembled media package 400 respectively provide a news ticker and a stock ticker. Although not illustrated, a social media feed can also be provided as a component media flow 410. As will be appreciated more or fewer component media flows 410 of different types and in different arrangements can be selected for inclusion in an assembled media package 400.

In various aspects, several component media flows 410 are assembled into intermediate media flows 420 before being assembled with one or more component media flows 410 or other intermediate media flows 420 into the assembled media package 400. For example, before combining the first component media flow 410a, third component media flow 410c, and fourth component media flow 410d with the other component media flows 410, the first component media flow 410a, third component media flow 410c, and fourth component media flow 410d are combined into an intermediate media flow 420. The intermediate media flow 420, in turn, is combined with the remaining component media flows 410 to produce the assembled media package 400.

Each of the component media flows 410 selected for inclusion in an assembled media package 400 can be chosen from live or ongoing data or from elements stored and pre-rendered in a media production facility 210 or a cloud network facility 220. For example, the logo and the pre-rendered graphic can be stored in a first cloud network facility 220a, while videos of two newscasters are received live from two separate media production facilities. The orchestration management schema 300 allows for a user at either of the media production facilities 210 in this example to select which component media flows 210 to include (regardless of their location or origin) and modify and combine those component media flows 210 according to various processes to create the assembled media package 400 to transmission to downstream affiliates and viewers.

Although illustrated as visualized components of the assembled media package 400, the component media flows 410 can include various data that are non-visual, hidden from the viewer, or that are optionally presented to the viewer. For example, the component media flows 410 can include video segments, audio segments (including secondary audio tracks), graphics (still and animated), content triggers (indicating transitions between segments of a data stream), content metadata entries describing contents of the component media flows 410 (e.g., guide or rating data, closed captioning or transcriptions), usage metadata entries describing how the component media flows have been used or broadcast, and combinations thereof.

Figure 5:
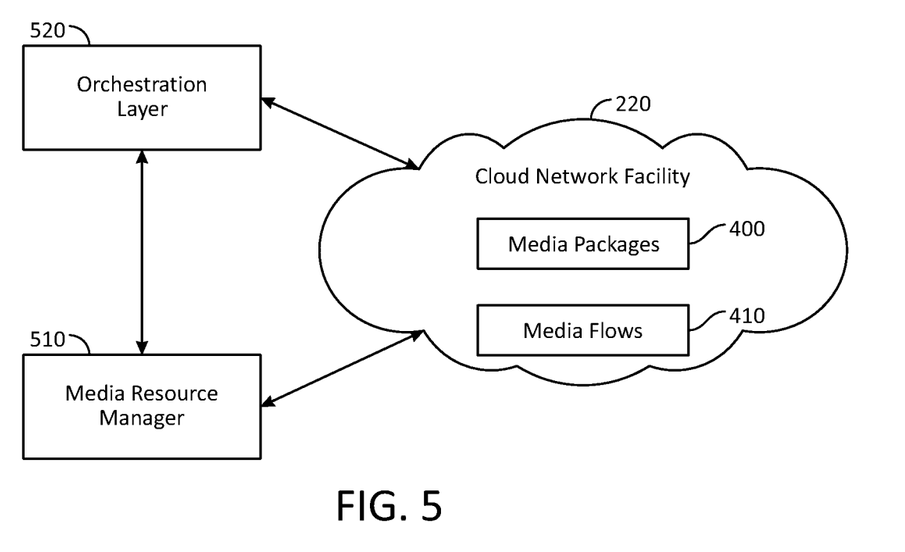
FIG. 5 illustrates an architecture for ensuring that a media package can be assembled in real time, according to aspects of the present disclosure.

FIG. 5 illustrates an architecture 500 for ensuring that a media package 400 can be assembled in real time, according to aspects of the present disclosure. Because each of the component media flows 410 (and intermediate media flows 420) can be generated at or stored at remotely located facilities from where the final media package 400 is assembled, the cloud network facility 220 used to assemble the component media flows 410 may have different amounts of time to manipulate each component media flow 410. Additionally, depending on the processes selected for manipulating the component media flows 410, the cloud network facility 220 may take different amounts of time in performing the various processes. Accordingly, a media resource manager 510 (e.g., ERM 124) is provided to ensure that the assembly process is performed within a target time period.

The media resource manager 510 is in communication with the media production facilities 210 and the cloud network facilities 220 and accesses the plurality of component media flows 410 via an orchestration layer 520 (e.g., SDNO 112). These component media flows 410 can be located at a media production facility 210, on a common carrier 230, or at a cloud network facility 220. To ensure that the media package 400 is assembled in time for transmission without noticeable timing artifacts, the media resource manager 510 assigns various target times for various processes to complete within at different locations in the media pipeline. Accordingly, the media resource manager 510 adjusts the sequential order in which the processes are performed, arbitrating which processes are performed linearly and which processes are performed in parallel, and the resources requisitioned from the cloud network facilities 220 to perform those processes.

The media resource manager 510, in conjunction with the orchestration layer 520, directs and organizes how the processes are performed based on the data requirements and timing requirements of the various processes and allows for rubber-banding of processes at a given location. For example, when total processing is constrained to a time threshold of 33 ms per frame, a first process, a second process, and a third process that are performed linearly (e.g., with the output of the first process being used in the input for the second process and the output of the second process being used in input for the third process) could each be allocated a target time of one-third of the time threshold (i.e., 11 ms). However, as various processes can take more or less time to complete, and spend some of the available time waiting for inputs to arrive (whether from a remote location or as an output of another process), the media resource manager 510 allows some processes to consume more time or less time to account for the greater or lesser timing needs of the other processes (i.e., rubber banding).

Additionally or alternatively, when a given process is identified as a bottleneck during assembly (e.g., due to high processing time or latency in receiving or sending outputs), the media resource manager 510 can reorder the processes to provide a larger portion of time for performing the bottleneck process, remove or replace the bottleneck process with a faster-to-complete process, requisition additional resources from the cloud network facility 220 to complete the bottleneck process faster, and combinations thereof. Similarly, when combining the identified component media flows 410 according to the identified processes with leftover processing time, the media resource manager 510 can add additional processes or media flows 410 to the media package 400, reorder the processes to consume fewer computing resources, reduce a resource requisition level from the cloud network facility 220, and combinations thereof.

Figure 6:
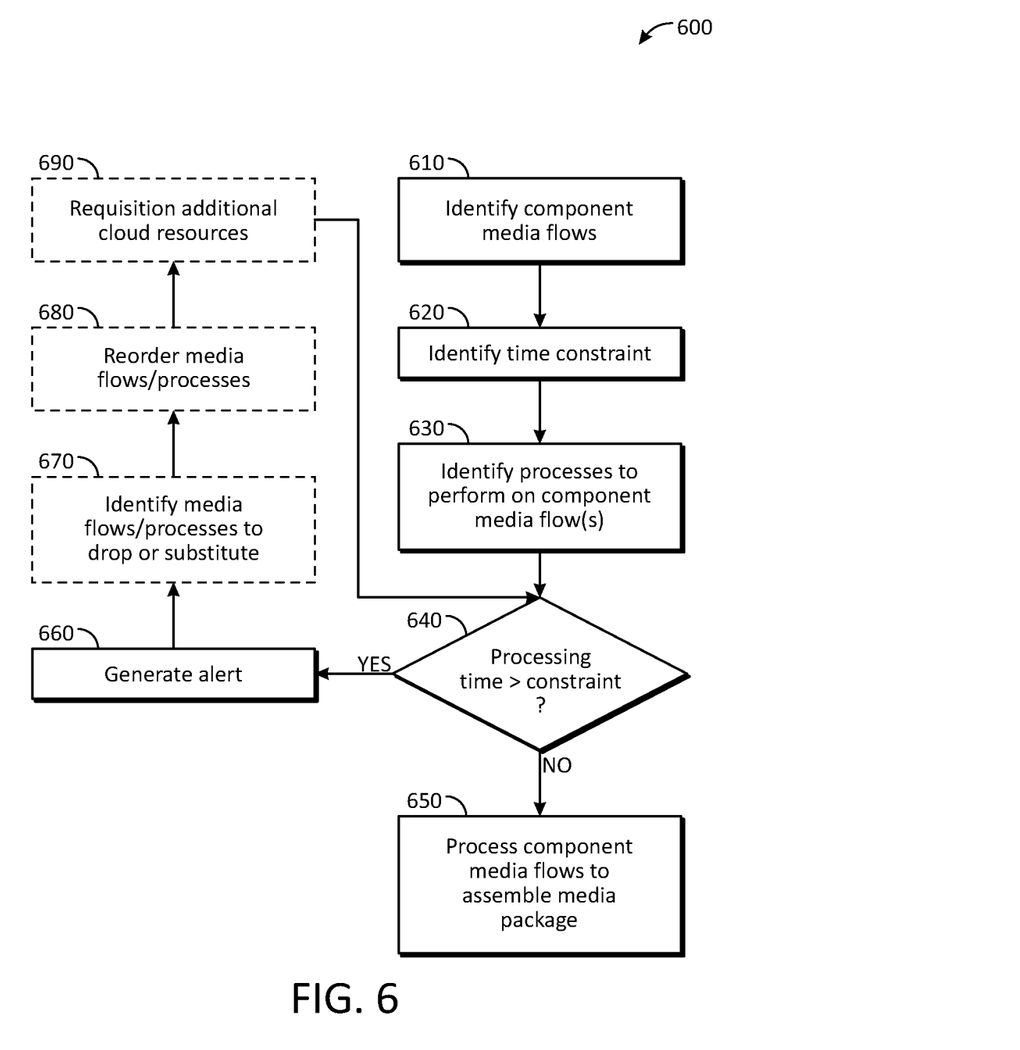
FIG. 6 is a flowchart of a method for non-linear management of real time sequential data in cloud instances via time constraints, according to aspects of the present disclosure.

FIG. 6 is a flowchart of a method 600 for non-linear management of real time sequential data in cloud instances via time constraints, according to aspects of the present disclosure. Method 600 begins with block 610, where the resource manager 510 receives a selection that identifies a plurality of component media flows for assembly into an assembled media package 400. The selected component media flows 410 can be received from various locations as ongoing streams of data or as pre-recorded or pre-rendered sets of data, which are combined and processed to create the assembled media package 400.

At block 620, the resource manager 510 identifies a time constraint for assembling the plurality of component media flows into the assembled media package 400. As used herein, the time constraint defines a maximum amount of time in which to assemble a media package 400 from the component media flows 410, and can be based on the video format selected (which has specific frame time boundaries and FPS requirements), combined with other attributes such as the latencies involved in transmission to where the processes are housed and performed (e.g. the cloud facilities 220). As will be appreciated, as the transmission format changes, location of production changes (e.g., for a mobile television crew), network latency conditions change, etc., the time constraint can be changed accordingly to account for the new conditions. For example, when the assembled media package 400 is a stream of frames used in a television multicast, the time constraint has a target time for a frame duration (e.g., 33 ms in the United States). In another example, when the assembled media package 400 is a stream of frames used in a teleconferencing solution with a frame rate of 60 frames per second (FPS), the time constraint has a target time of 17 ms.

At block 630, the resource manager 510 identifies a plurality of processes to perform with respect to the plurality of component media flows 410 (identified per block 610) during assembly of the assembled media package 400. For example, a first process can identify two or more video streams to combine and a layering order in which to combine the video streams (e.g., display a first stream to the right of a second stream, display a third stream in a top left corner of the first stream over the content of the first stream) and a second process performs color correction on a first video stream to match the saturation of a second video stream. Various processes can include overlaying, repositioning, animating (e.g., fading in/out, scrolling, swiping, etc.), color balancing/filtering, audio balancing/filtering, appending/combining, and combinations thereof, among other examples.

At block 640, the resource manager 510 determines whether an estimated time to perform the identified processes with respect to the identified component media flows 410 exceeds the time constraint identified in block 620. When the estimated time is equal to or less than the time constraint, method 600 proceeds to block 650, where the cloud network facility 220 processes the component media flows 410 according to the identified processes to assemble the media package 400. The media package 400 is then transmitted to the viewers, and method 600 returns to block 610 to continue processing the current component media flows 410, adjust the component media flows 410, or begin a new segment with different component media flows 410.

In response to the estimated time to perform the plurality of processes with respect to the plurality of component media flows exceeding the time constraint identified in block 620, method 600 proceeds to block 660, where the resource manager 510 generates an alert to adjust performance of the plurality of processes with respect to the plurality of component media flows 410 to increase a speed of assembly to fall within the time constraint. In various aspects, the alert is transmitted to an operator at a media production facility 210 to select an appropriate action to take to increase a speed of assembly, which can include various suggestions identified by the resource manager 510. In some aspects the resource manager 510 automatically performs various actions to increase a speed of assembly, and the operator at the media production facility 210 can approve or override the automatically performed actions. Accordingly, the resource manager 510 can suggest (and perform on approval) or automatically perform one or more of blocks 670, 680, or 690 to increase a speed of performance. After performing one or more of blocks 670, 680, or 690, method 600 returns to block 640 to verify whether the actions were sufficient to reduce processing time, or if further actions need to be taken. It is noted that one or more of blocks 670, 680, or 690 may be omitted such that the method 600 can proceed from block 660 directly to block 670, block 680, or block 690, or such that the method 600 can return to block 640 directly from block 670, block 680, or block 690. In addition, to the extent that two or more of the actions described in blocks 670, 680, and 690 are performed, the actions can be performed in any order or substantially in parallel with one another.

In some aspects, the resource manager 510 identifies a bottleneck procedure that is primarily responsible for the excess processing time that can be adjusted to bring the processing time below the time constraint. In some aspects, the bottleneck procedure is the process or set of processes that can most readily be adjusted to bring the processing time below the time constraint. For example, consider a sequentially performed series of process in which a first process takes 10 ms to complete, a second process takes 20 ms to complete, and a third process takes 5 ms to complete (exceeding a time constraint of 33 ms). In some aspects, the second process is identified as the bottleneck process due to the associated completion time being the longest. In various aspects, the first process is identified as a bottleneck process if a known-faster alternative for the first process exists, the first process can be moved later in the sequence (e.g., to time shift receiving inputs to account to latency), or dropped from the sequence. In further aspects, if the first process can be performed in parallel with the second process, the sequence is identified as the bottleneck procedure and can be parallelized to improve its overall speed of completion. Accordingly, depending on the type of bottleneck procedure identified, the resource manager 510 can perform one or more of blocks 670, 680, or 690 to adjust the bottleneck procedure and thereby assemble the media package 400 in less than the time constraint.

At block 670, the resource manager 510 identifies component media flows 410 or processes to drop (i.e., not include in the media package 400) or that can be substituted for faster loading or less computationally intensive component media flows 410 or processes. For example, when a given component media flow 410 of a video stream from a high latency location is identified as causing the collective assembly of all of the other component media flows 410 to take longer than the target time, the resource manager 510 can drop the given component media flow 410 (and any downstream linear processes or associated component media flows 410) so that it is not included in the media package 400. Accordingly, when an alternate component media flow 410 at a different location than the high-latency component media flow 410 is identified, the cloud network facility 220 can substitute the alternate media flow instead of the originally identified media flow to produce the media package 400 with less latency.

In another example, the dropped component media flow 410 of the video stream from the high latency location can be replaced with a static image and a lower-latency audio-only stream or a lower quality video stream (e.g., lower bits per second). In another example, when a given process of adding an animation, color correction, or other visual effect to a video stream is identified as a bottleneck, the resource manager 510 can indicate that the given process is to be skipped or otherwise not performed. In some aspects, the resource manager 510 can substitute a faster or less computationally intensive process for the dropped process (e.g., inserting a static image rather than performing a fade-in of an animated image).

At block 680, the resource manager 510 reorders how the component media flows 410 or processes are performed in the cloud network facilities 220 to increase the speed of assembly of the media package 400. For example, the processes can initially be ordered in a linear sequence in which a first process is performed with respect to the plurality of component media flows to produce a first intermediate flow and a second process is performed with respect to the first intermediate flow. However, if the linear sequence takes longer to perform than the target time, the resource manager 510 reorders the plurality of processes to include a parallel sequence in which the first process and the second process are performed relative to the plurality of component media flows 410 at substantially the same time (e.g., ±5 ms) as one another. In another example, when a first process that is a bottleneck for assembly is performed in a linear sequence before a second process, but the resource manager 510 identifies that the second process can be performed independently of input from the first process, the resource manager 510 can reorder performance so that the second process is performed first to allow the first process more time to receive the necessary inputs. Similarly, when the bottleneck process itself cannot be reordered, the resource manager 510 can identify other processes (e.g., a first process and a second process other than the bottleneck process) that can be reordered for a different linear order of performance, for parallel performance, or combinations thereof.

At block 690, the resource manager 510 requisitions additional resources from the cloud network facility 220 to perform the plurality of processes. The cloud network facility 220 can offer computing hardware and software as a service to the media production facilities 210, which can expand and contract as the need for those services rise and fall over time. Accordingly, when the resource manager 510 identifies that additional computer resources are needed to complete the processes within the time constraint, the resource manager 510 can requisition the needed computing resources. For example, a plurality of processes may be performed linearly when one processing core, virtual machine, or instance of a software package is initially requisitioned, but when the plurality of processes are reordered to include parallel execution of processes, the resource manager 510 requisitions a second processing core, virtual machine, or instance of a software package to perform the second set of processes in parallel to the first set of processes performed using the original processing core, virtual machine, or instance of a software package.

Figure 7:
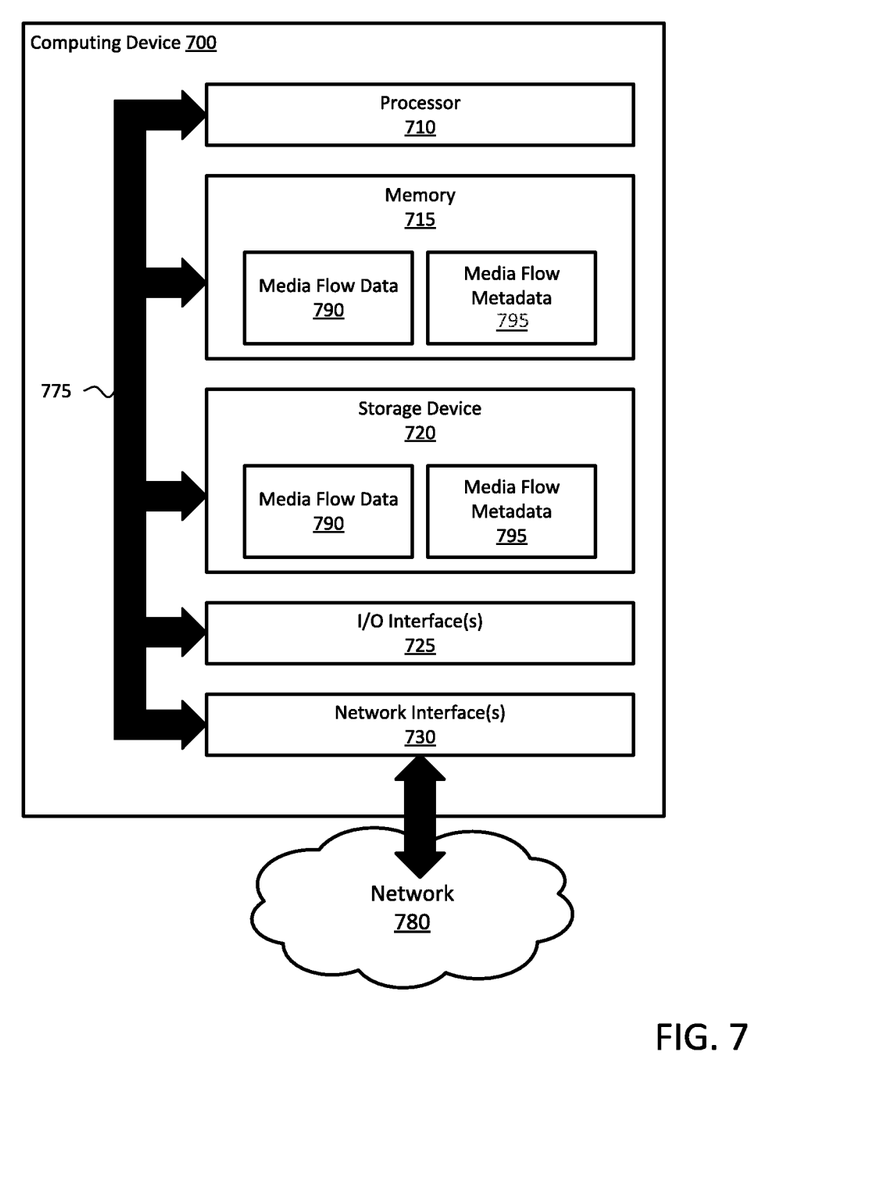
FIG. 7 illustrates a computing device, such as may be used as a media production device, cloud service device, or other computing system described or referenced herein, according to aspects of the present disclosure.

FIG. 7 illustrates a computing device 700, such as may be used as a media production device, cloud service device, or other computing system described or referenced herein, according to aspects of the present disclosure. Although depicted as one physical device, in some aspects, the computing device 700 may be implemented as a virtual device or service, and/or across a number of devices (e.g., in a cloud environment). As illustrated, the computing device 700 includes a processor 710, memory 715, storage device 720, a network interface 730, and one or more Input/Output (I/O) Interfaces 725. The processor 710 retrieves and executes programming instructions stored in the memory 715, as well as stores and retrieves application data residing in the storage device 720. The processor 710 is generally representative of a single Central Processing Unit (CPU) and/or Graphical Processing Unit (GPU), multiple CPUs and/or GPUs, a single CPU and/or GPU having multiple processing cores, and the like. The memory 715 is generally included to be representative of a Random Access Memory (RAM). The storage device 720 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some aspects, input and output devices (such as a mouse, a keyboard, a monitor, a touchscreen, etc.) are connected via the I/O interface(s) 725. Further, via the network interface 730, the computing device can be communicatively coupled with one or more other devices and components (e.g., via the network 780, which may include the Internet, local network(s), and the like). Additionally, the network 780 may include wired connections, wireless connections, or a combination of wired and wireless connections. As illustrated, the processor 710, memory 715, storage device 720, I/O interface(s) 725, and network interface(s) 730 are communicatively coupled by one or more buses 775.

The computing device 700 can locally store media flow data 790 and/or media flow metadata 795 in the memory 715 (e.g., for generation and modification) and/or in the storage device 720, and may access remotely stored media flow data 790 and/or media flow metadata 795 stored by another computing device 700 via the network interface(s) 730 and the network. Although not illustrated, the memory 715 and the storage device 720 may also store one or more applications, operating systems, APIs, which may be stored as various computer readable instructions that are executed by the processor 710 to perform the various operations described in the present disclosure.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
receiving, at a cloud network facility from a media production facility, a selection of a plurality of component media flows for assembly into an assembled media package;
identifying a time constraint for assembling the plurality of component media flows into the assembled media package;
identifying a plurality of processes to perform with respect to the plurality of component media flows during assembly of the assembled media package;
in response to an estimated time to perform the plurality of processes with respect to the plurality of component media flows exceeding the time constraint, adjusting performance of the plurality of processes with respect to the plurality of component media flows to increase a speed of performance; and
performing, at the cloud network facility, the plurality of processes with respect to the plurality of component media flows as adjusted to produce the assembled media package.

2. The method of claim 1, further comprising:
ordering the plurality of processes to include a linear sequence in which a first process is performed with respect to the plurality of component media flows to produce a first intermediate flow and a second process is performed with respect to the first intermediate flow, wherein a combined time to perform the first process and the second process is less than or equal to the time constraint.

3. The method of claim 1, further comprising:
ordering the plurality of processes to include a parallel sequence in which a first process is performed with respect to the plurality of component media flows to produce a first intermediate flow and a second process is performed with respect to the plurality of component media flows to produce a second intermediate flow at substantially the same time as the first intermediate flow is produced.

4. The method of claim 3, wherein the plurality of processes are ordered to include the parallel sequence in response to identifying that ordering the first process linearly to the second process results in a combined time to perform the first process and the second process greater than the time constraint, wherein the second process, when ordered linearly with respect to the first process, is performed after the first process completes.

5. The method of claim 1, wherein adjusting performance of the plurality of processes replaces a first process of the plurality of processes with a second process having a shorter performance time than the first process.

6. The method of claim 1, wherein adjusting performance of the plurality of processes drops a first process of the plurality of processes from the plurality of processes or drops a first component media flow from the plurality of media flows.

7. The method of claim 1, wherein adjusting performance of the plurality of processes includes requisitioning additional resources from the cloud network facility to perform the plurality of processes.

8. A method, comprising:
identifying a first media flow at a media production facility;
identifying a second media flow at a different location than the media production facility;
identifying a time constraint for producing a media package at a cloud network facility, wherein the media package is assembled to include the first media flow and the second media flow;
in response to assembly of the media package exceeding the time constraint, identifying a bottleneck procedure in producing the media package;

adjusting the bottleneck procedure to assemble the media package in a time less than or equal to the time constraint;

assembling the media package based on the first media flow, the second media flow and the adjusted bottleneck procedure; and transmitting the media package.

9. The method of claim 8, wherein the different location comprises at least one of:

a second media production facility;

a common carrier between the second media production facility and the cloud network facility;

the cloud network facility; and a second cloud network facility.

10. The method of claim 8, wherein adjusting the bottleneck procedure further comprises:

substituting an alternate media flow for one of the first media flow or the second media flow, wherein the alternate media flow is located at a facility with lower latency to the cloud network facility than the media production facility or the different location, respectively.

11. The method of claim 8, wherein adjusting the bottleneck procedure further comprises:

reordering a first process and a second process from being performed sequentially in the cloud network facility to being performed in parallel.

12. The method of claim 8, wherein adjusting the bottleneck procedure further comprises:

dropping a procedure from performance.

13. The method of claim 8, wherein the first media flow comprises one of:

a video segment;

an audio segment;

a still graphic;

a content trigger;

a content metadata entry that describes contents of the second media flow; or usage metadata entry describing how the second media flow has been used or broadcast.

14. A system, comprising:

a media production facility in communication with a cloud network facility via a common carrier;

an orchestration layer running in the media production facility and the cloud network facility over the common carrier; and a resource manager in communication with the media production facility and the cloud network facility configured to:

in response to determining an estimated time of production of an assembled media package exceeds a time constraint to produce the assembled media package, requisition additional resources from the cloud network facility to produce the assembled media package in a first time period equal to or less than the time constraint; and access, via the orchestration layer, a plurality of component media flows located at the media production facility, on the common carrier, and at the cloud network facility to produce the assembled media package from the plurality of component media flows in the first time period and using the requisitioned additional resources.

15. The system of claim 14, further comprising:

a second media production facility in communication with the cloud network facility via the common carrier;

wherein the orchestration layer further runs in the second media production facility; and wherein the resource manager is further configured to access, via the orchestration layer, component media flows located at the second media production facility to produce the assembled media package within the first time period time.

16. The system of claim 14, further comprising:

a second cloud network facility in communication with media production facility via the common carrier;

wherein the orchestration layer further runs in the second cloud network facility; and wherein the resource manager is further configured to access, via the orchestration layer, component media flows located at the second cloud network facility to produce the assembled media package within the first time period.

17. The system of claim 14, wherein the resource manager is further configured to, in response to determining the estimated time of production of the assembled media package exceeds the time constraint, identify a process performed with respect to the plurality of component media flows to drop to produce the assembled media package in the first time period.

18. The system of claim 14, wherein the resource manager is further configured to:

reorder a plurality of processes performed with respect to the plurality of component media flows to produce the assembled media package such that a first process originally performed in sequence and before a second process is performed in parallel with the second process.

19. The system of claim 14, wherein the component media flows include:

video segments;

audio segments;

graphics;

content triggers;

content metadata describing contents of the component media flows;

usage metadata describing how the component media flows have been used or broadcast; or any combination thereof.

\* \* \* \* \*

UNITED STATES PATENT AND TRADEMARK OFFICE
CERTIFICATE OF CORRECTION

| | |
|---|---|
| PATENT NO. | : 11,455,228 B2 |
| APPLICATION NO. | : 16/983063 |
| DATED | : September 27, 2022 |
| INVENTOR(S) | : Michael J. Strein et al. |

It is certified that error appears in the above-identified patent and that said Letters Patent is hereby corrected as shown below:

In the Drawings

On sheet 1 of 8, in Figure 1, Line 7, delete "Mulitcast" and insert -- Multicast --.

In the Specification

In Column 1, Line 23, delete "in in" and insert -- in --.

In the Claims

In Column 18, Line 18, in Claim 15, delete "period time." and insert -- period. --.

Signed and Sealed this
Twenty-first Day of February, 2023

*Katherine Kelly Vidal*

Katherine Kelly Vidal
*Director of the United States Patent and Trademark Office*